May 24, 1927.
J. W. ROCKEFELLER, JR
1,630,096
SCALE
Filed April 22, 1926
4 Sheets-Sheet 1
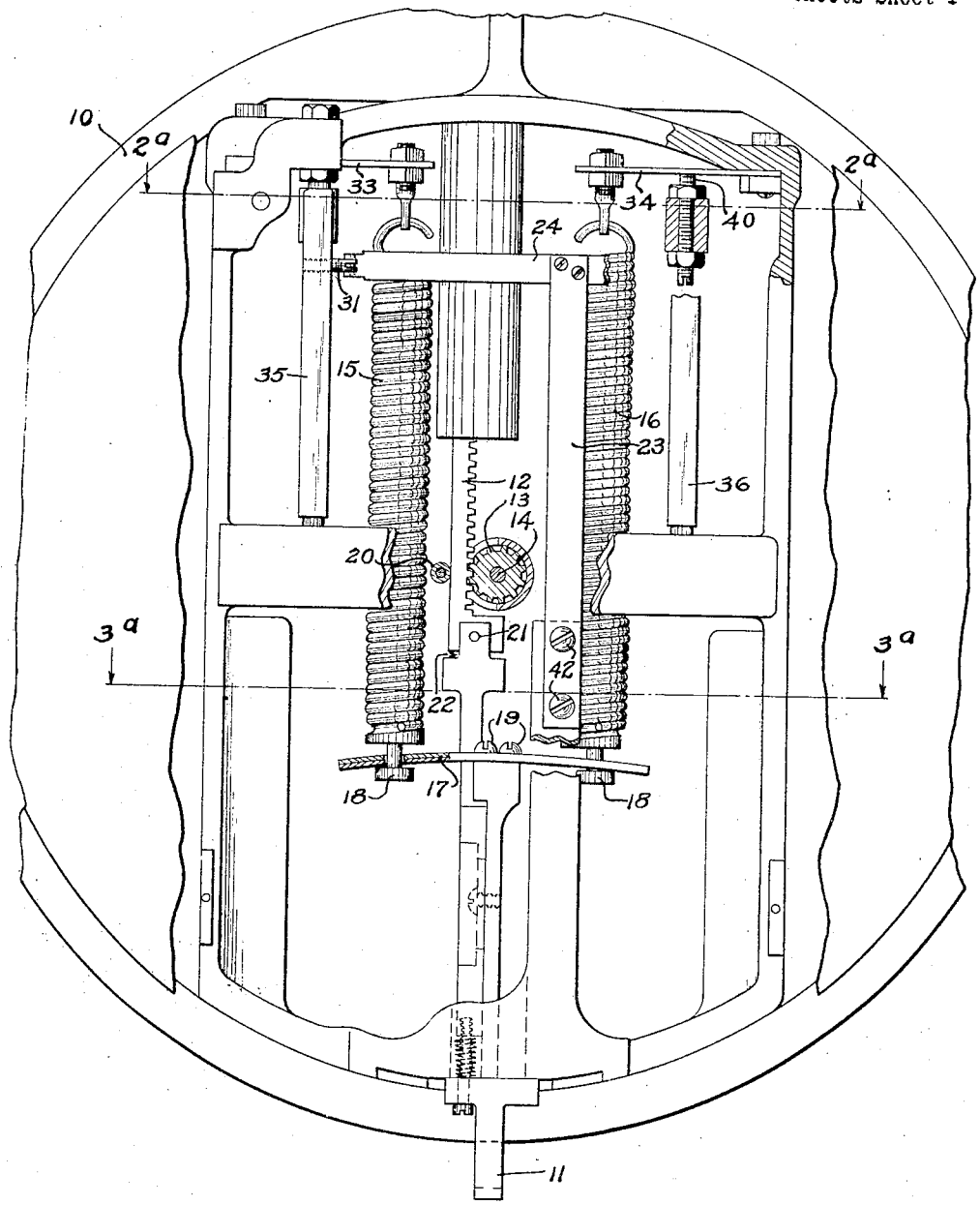
INVENTOR.
John W. Rockefeller Jr.
BY
ATTORNEYS.

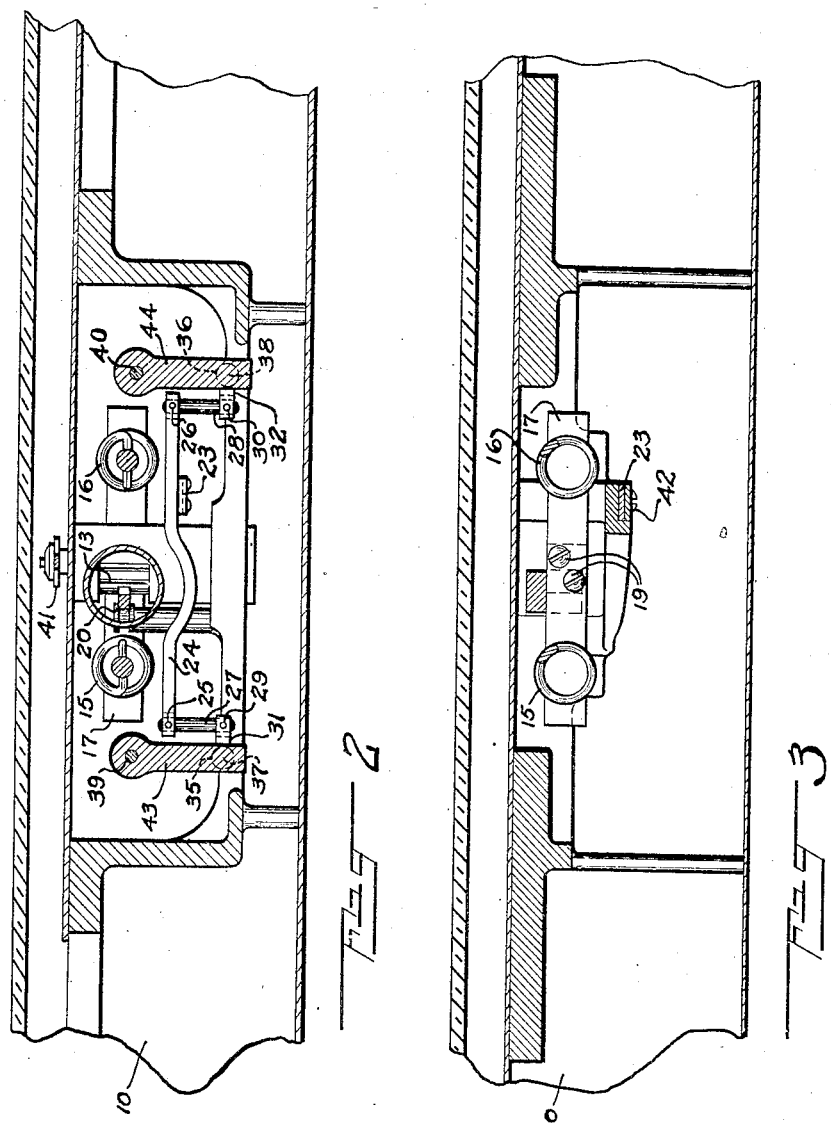

May 24, 1927.

J. W. ROCKEFELLER, JR 1,630,096

SCALE

Filed April 22, 1926

INVENTOR.
John W. Rockefeller Jr.
BY
ATTORNEYS.

May 24, 1927.
J. W. ROCKEFELLER, JR
1,630,096
SCALE
Filed April 22, 1926
4 Sheets-Sheet 4
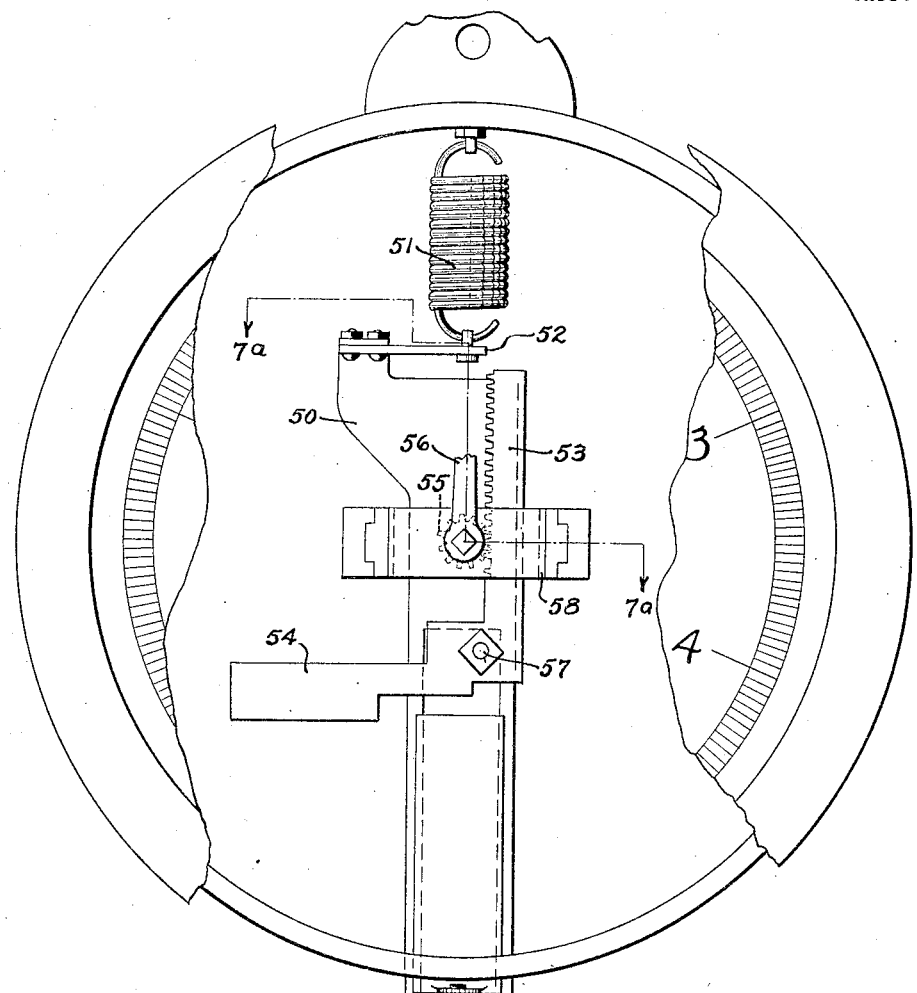
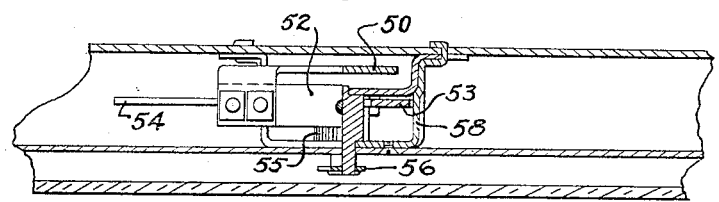
INVENTOR.
John W. Rockefeller Jr
BY
ATTORNEYS.

Patented May 24, 1927.

1,630,096

UNITED STATES PATENT OFFICE.

JOHN W. ROCKEFELLER, JR., OF NEW YORK, N. Y., ASSIGNOR TO JOHN CHATILLON & SONS, OF NEW YORK, N. Y., A CORPORATION OF NEW YORK.

SCALE.

Application filed April 22, 1926. Serial No. 103,775.

This invention relates to spring scales, and has for its object to provide means tending to automatically hold the pointer at zero under varying conditions of temperature. In a spring scale, the pointer tends to fluctuate about the zero as the spring length varies with temperature. This is ordinarily corrected by a thumb screw, which is inconvenient and objectionable, especially under many sealers' regulations.

According to this invention, automatic temperature responsive means is located between the spring and indicator to compensate for length changes in the spring and thereby hold the pointer at zero. Specifically, this means includes a bi-metallic element interposed between the runner, load support, or other indicator actuating part, and the spring in such manner that temperature change causes flexure of said thermal element to substantially neutralize change in length of the spring due to temperature.

In the Chatillon Patent #1,220,192 dated March 27, 1917, an automatic means is shown for maintaining the spring strength uniform and thereby maintaining accuracy in weighing under varying conditions of temperature, but no automatic means is shown for holding the pointer at zero. This invention is shown in combination with the mechanism of said patent whereby automatic compensation is made for changes in both spring strength and length with temperature.

Fig. 1 shows a scale embodying this invention.

Fig. 2 is a section on line 2ª—2ª of Fig. 1.

Fig. 3 is a section on the line 3ª—3ª of Fig. 1.

Fig. 6 shows the temperature responsive means for length changes embodied in a single spring scale.

Fig. 7 is a section on the line 7ª—7ª of Fig. 6.

Figure 4:
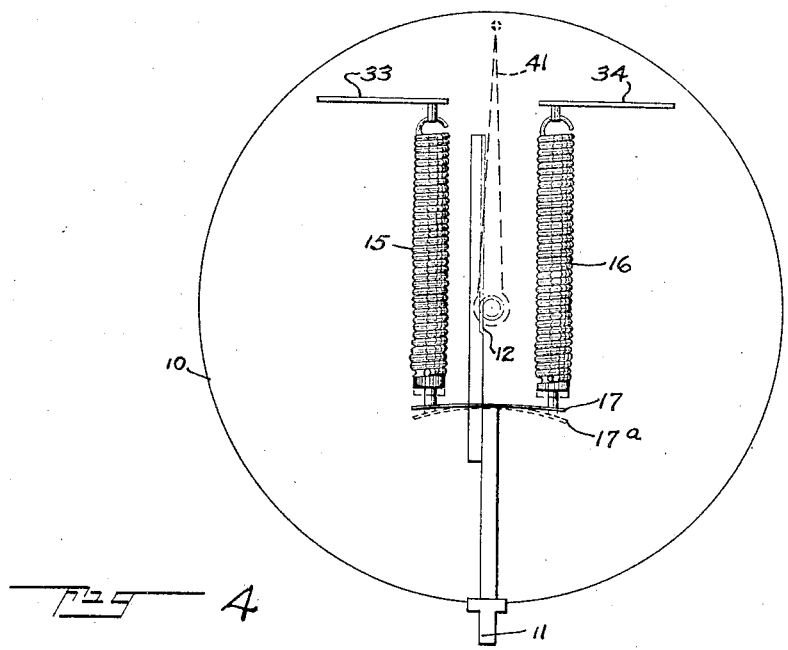
Fig. 4 is a diagrammatic representation of the scale in no-load position.

This scale is provided with the usual casing 10 through which projects the movable load support 11, connected to the rack 12, engaging the pinion 13 on the pointer shaft 14. The load-supporting springs 15 and 16 are secured between the casing and load-support. At their lower ends adjusting screws 18 connect these springs with a bi-metallic beam or thermal element 17 clamped to the load-support by the screws 19 and having a permanent set about as indicated. This thermal element is preferably made of brass and invar, the brass being on top as shown in Fig. 1 so that as the springs 15 and 16 increase in length with rise in temperature, the brass expanding more than the invar increases curvature of the thermal element, with the result that the load-support is maintained substantially stationary, even with the elongation of the springs due to temperature changes. This prevents the indicator being moved from zero with temperature changes. A roller 20 serves as a guide to keep the rack 12 in engagement with pinion 13. To take care of side thrusts on the load-support while still maintaining the rack in engagement with its guide and pinion the connection between load-support and rack is made pivotal as shown at 21, and light springs 22 are placed between the bottom of the rack and the load-support.

In addition to the foregoing temperature compensation for length changes this scale is also provided with temperature responsive means to compensate for the changes in the modulus or resiliency of the springs. This latter compensating means comprises a bi-metallic thermal element 23 secured at its lower end by screws 42 to the casing. Its upper end is clamped to the transverse member 24, shown in Figs. 1 and 2. A pivotal connection 25 and 26 at each end of the member 24 connects with the links 27 and 28 which in turn are pivoted at 29 and 30 to projecting arms 31 and 32 of the columns 35 and 36. Arms 43 and 44 project from columns 35 and 36 at right angles to the arms 31 and 32, and form with these arms bell crank levers. On the ends of arms 43 and 44 are provided the adjustable supporting pins 39 and 40, engaging as fulcrums the underside of the flat cantilever springs 33 and 34 to which the coil springs 15 and 16 are attached. Pins 39 and 40 are adjustable to any height, as shown in Fig. 1. Since with the rise in temperature the resiliency of springs 15 and 16 is increased, in order to compensate for such modulus change the flat spring supports 33 and 34 are made stiffer. To do this the bi-metallic element 23 is so arranged as to move its upper end away from the springs, causing motion to be transmitted through the links 27 and 28, arms 31 and 32 causing movement of the arms 43 and 44 about the pivotal columns 35 and 36 so that the pins 39 and 40 are moved toward the points of attachment springs 15 and 16. This shortens the effective length of cantilevers 33 and 34, stiffening them.

Figure 5:
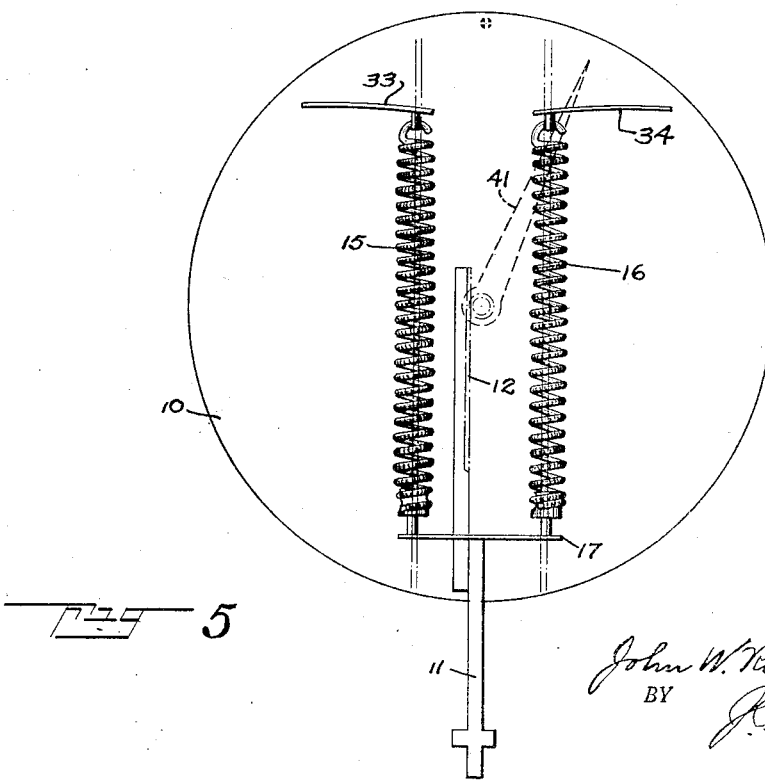
Fig. 5 is a diagrammatic representation of the same scale at substantially full-load position.

In Fig. 4 is shown a line diagram of the scale of Fig. 1 in no-load position, the indicator 41 being on the zero and the cantilever springs 33 and 34 being substantially straight as shown. The dotted lines 17a in Fig. 4 show how the curvature of the thermal element 17 is increased with temperature increase. In Fig. 5 the line diagram indicates the arrangement of the parts at substantially full load. Here the cantilever springs 33 and 34 are deflected downwardly and the thermal element 17 is deflected until nearly straight. In Fig. 5 it will be seen that flexure of springs 33 and 34 changes their effective length and causes springs 15 and 16 to be moved laterally farther apart a small amount. As the thermal element 17 becomes substantially straight under full load its effective length increases and causes the lower portions of springs 15 and 16 to be likewise moved apart farther, with the result that the springs 15 and 16 are maintained substantially parallel at all times, and changes in length of the arms 33 and 34 are thus compensated. If desired springs 33 and 34 might be given a permanent set upwardly and the thermal element 17 made substantially flat for no-load position, or each might be given a small permanent set so that each would be more nearly flat or at maximum length for loads less than full-load, with the result that the effective length changes in 17, 33 and 34 would be less.

In Fig. 6 is shown a single spring scale having a load-support 50 attached to the single spring 51 through the thermal element 52, rigidly secured to the load-support 50. The rack 53 is pivoted at 57 to the load-support, and a counterweight 54 arranged as shown to keep the rack always in engagement with the pinion 55 on the shaft of the indicator 56. A yoke 58 limits undue lateral movement of the load-support, and the pivotal arrangement shown for the rack enables the same to be maintained in engagement with the pinion under any lateral thrusts on the load-support. The thermal element 52 is preferably brass and invar, with the brass arranged on top in Fig. 6, so that increase in length of the spring 51 causes element 52 to be bent downwardly to compensate for length changes of the spring without causing a corresponding movement of the load-support.

Among the advantages of this invention may be mentioned its simplicity, compactness and reliability though of inexpensive construction, enabling less expensive scales to be provided with temperature compensating means. While invar and brass have been referred to as the preferred components of the thermal elements it will, nevertheless, be understood that other thermal combinations may be used, as for example invar and zinc. Invar is a well known ferrous alloy, having a high percentage of nickel. This is the first spring scale of simple construction in which complete automatic compensation for temperature changes has been provided, that is, in which compensation for temperature change in resiliency and in length are both present. A special advantage resides in the particular arrangement and cooperation between these two temperature responsive and compensating means, whereby effective changes in length of lever arms does not cause any substantial error, but, as shown in Fig. 1, results in the springs being maintained substantially parallel at all times.

I claim:

1. In a scale, the combination with a load support, of means opposing the load on said support, an indicator having an operative connection with said load support, and temperature responsive means between said opposing means and the load support for compensating for any tendency of the indicator to move from its no-load position with temperature change.

2. In a scale, the combination with a coil spring, of a load support connected to said spring, an indicator, a moving member actuating said indicator from said spring, and means between said spring and actuating member for compensating for length changes in said spring with temperature an amount such that no appreciable movement of said indicator results with ordinary variations in temperature.

3. In a scale, the combination with a load support, of a coil spring, an indicator having an operative connection with said load support, a bi-metallic leaf spring in series with said coil spring and arranged to substantially compensate for length changes with temperature in the coil spring.

4. In a scale, the combination with a load support, of a casing, means opposing a load on said support, an indicator having an operative connection with said load support, temperature responsive means between said opposing means and load support for compensating for length changes in said opposing means with temperature change, said temperature responsive means being entirely within said casing.

5. In a scale, the combination with a spring, of a load support, an indicator having an operative connection with said load support, a resilient member on which said spring is secured, means responsive to the temperature for changing the resiliency of said member inversely as the resiliency of said spring changes with temperature, and temperature responsive means between said spring and indicator for compensating for length changes in said spring due to temperature.

6. In a scale, the combination with a spring, of an indicator actuated thereby, a load support connected to said spring, a resilient member to which said spring is secured, temperature responsive means for changing the resiliency of said member inversely as the resiliency of said spring is changed with temperature, and temperature responsive means between said spring and indicator for compensating for length changes in said spring due to temperature, each of said temperature responsive means cooperating with the other temperature responsive means in such manner that compensation is provided for in movement of said spring normal to its direction of deflection under load.

7. In a scale, the combination with an indicator, of a load support, a pair of coil springs connected to said load support, temperature responsive means to compensate for temperature variations in resiliency of said springs, and means to maintain the relationship of said springs under movement of said temperature responsive means so that there is no substantial error due to change in the moment arm of either spring.

8. In a scale, the combination with a coil spring, of an indicator, transmission means between said spring and indicator, a flat spring supporting said coil spring at a free end, temperature responsive means for automatically moving a fulcrum of said flat spring, and means for compensating for changes in the moment arm of said flat spring with flexure.

9. In a scale, the combination with a coil spring, of an indicator, transmission means between said spring and indicator, a flat spring supporting said coil spring at a free end, temperature responsive means for automatically moving a fulcrum of said flat spring, and temperature responsive means to compensate for length changes in said coil spring with temperature variations.

10. In a scale, the combination with a coil spring, of an indicator, transmission means between said spring and indicator, a flat spring supporting said coil spring at a free end, temperature responsive means for automatically moving a fulcrum of said flat spring, and temperature responsive means to compensate for length changes in said spring with temperature variations, said last mentioned means comprising a flat spring at the end of said coil springs opposite the first flat spring and arranged to flex in the opposite direction to said first flat spring and maintain the axis of said coil spring substantially parallel with said axis in all positions thereof.

11. In a spring scale, a spring beam and coil spring attached to each end thereof, another supporting spring for each coil spring, a thermostat, a movable support for each flat spring, means including multiplying connections connecting said thermostat and said movable supports, and means for moving the attachment of said coil spring at each end of said beam to compensate for length changes in said coil springs with temperature variations.

12. In a scale, the combination with a bimetallic thermal beam, of a coil spring secured at each end of said beam, said beam being constructed to permit relative movement between its ends and center with temperature change to compensate for length changes in said coil springs with temperature variations.

13. In a scale, the combination with a load support, of a coil spring, an indicator having an operative connection with said load support, a bi-metallic thermal element having the coil spring secured thereto between said load support and indicator in such manner that temperature changes in length of said coil spring are compensated for by said thermal element.

14. In a scale, the combination with a load support, a coil spring, a resilient mounting for said coil spring, temperature responsive means for changing the resiliency of said mounting to compensate for changes in resiliency of the coil spring with temperature, and additional temperature responsive means for changing the position of said mounting to compensate for changes in length of said coil spring with temperature.

Signed at New York city in the county of New York and State of New York this 20th day of April, A. D. 1926.

JOHN W. ROCKEFELLER, Jr.